United States Patent [19]

Adachi

[11] 4,270,148
[45] May 26, 1981

[54] FACSIMILE TRANSMISSION APPARATUS

[75] Inventor: Eiichi Adachi, Tokyo, Japan

[73] Assignee: Ricoh Company, Ltd., Tokyo, Japan

[21] Appl. No.: 56,568

[22] Filed: Jul. 11, 1979

[30] Foreign Application Priority Data

Jul. 18, 1978 [JP] Japan ................................. 53-86721

[51] Int. Cl.³ ............................................. H04N 7/12
[52] U.S. Cl. .................................... 358/260; 370/102
[58] Field of Search ................ 370/102; 358/260, 261, 358/280

[56] References Cited

U.S. PATENT DOCUMENTS

| | | | |
|---|---|---|---|
| 3,504,287 | 3/1970 | Deregnaucourt | 370/102 |
| 4,044,382 | 8/1977 | Yagishita | 358/260 |
| 4,090,222 | 5/1978 | Nakagome et al. | 358/280 |
| 4,131,915 | 12/1978 | Nakagome et al. | 358/260 |
| 4,149,192 | 4/1979 | Takeuchi | 358/260 |
| 4,151,373 | 4/1979 | Widmer et al. | 370/102 |

Primary Examiner—Joseph A. Orsino, Jr.
Attorney, Agent, or Firm—David G. Alexander

[57] ABSTRACT

An input buffer (16) functions to store one line of data from a scanner (12) while feeding out a previous line to a run length encoder (17). The compressed data is fed from the run length encoder (17) to an output buffer memory (19) having a fixed capacity. The compressed data is fed to the output buffer (19) intermittently while it is fed out of the output buffer (19) continuously for modulation and transmission. In response to a start signal indicating that a line of data has been stored in the input buffer (16), fill bits are fed to the output buffer (19) at high speed until a full signal is generated indicating that the output buffer (19) is full. Then, a sync signal is fed to the output buffer (19) followed by compressed data from the run length encoder (17).

4 Claims, 3 Drawing Figures

FACSIMILE TRANSMISSION APPARATUS

BACKGROUND OF THE INVENTION

The present invention relates to a facsimile transmission apparatus employing data compression.

In such a facsimile system, data from a scanner is run length encoded, modulated and transmitted to a remote receiver which demodulates and decodes the data for reproduction of an original document which was scanned by the transmitter. It is convenient to perform the run length encoding on a line by line basis corresponding to the orthogonal scanning pattern of the document.

In order to enable an input buffer memory at the receiver to have a small capacity and production cost, it is desirable to construct the system in such a manner that the time required for transmission of one line of coded or compressed data is shorter than the time required for decoding the data and reproducing the corresponding line. In this manner, the rate at which data is fed out of the input buffer at the receiver is faster than the rate at which data is fed in, and the buffer capacity may be small.

In order to ensure that the transmission time is longer than the operating time at the receiver, means are provided to ensure that each line of coded or compressed data comprises at least a predetermined number of bits. Since the code for scanning a perfectly blank linear area, for example, of the original document will consist of only a few bits, said means function to add enough fill bits, typically consisting of zeroes, to the code to increase the total number of bits to the predetermined number. A sync code is added at the end of the fill bits to indicate to the receiver that the end of the current line has been reached. In cases where the number of bits of coded data exceeds the predetermined number, no fill bits are necessary and only the sync code is added.

Prior art means for adding fill bits generally comprise a counter for counting the number of bits of the coded data, subtractor for subtracting the counted number of bits from the predetermined number and fill bit generator means for generating a number of fill bits equal to the output of the subtractor. Such circuitry is complicated and adds unnecessarily to the cost of the apparatus.

SUMMARY OF THE INVENTION

A facsimile transmission apparatus embodying the present invention includes scanning means, compression means, input buffer means for storing two lines of data from the scanning means in such a manner as to feed out one line while storing a next line and output buffer memory means having a predetermined capacity for intermittently storing compressed data from the compression means while continuously feeding out the compressed data, and is characterized by comprising start detector means for detecting completion of storing a line of data in the input buffer means and producing a start signal in response thereto, full detector means for detecting a full condition of the output buffer means and producing a full signal in response thereto, fill bit generator means, sync signal generator means and control means for controlling, in response to the start signal, the fill bit generator means to feed fill bits to the output buffer means until the full signal is generated, then controlling the sync signal generator means to feed the sync signal to the output buffer means and then controlling the compression means to feed compressed data to the output buffer means.

In accordance with the present invention, an input buffer functions to store one line of data from a scanner while feeding out a previous line to a run length encoder. The compressed data is fed from the run length encoder to an output buffer memory having a fixed capacity. The compressed data is fed to the output buffer intermittently while it is fed out of the output buffer continuously for modulation and transmission. In response to a start signal indicating that a line of data has been stored in the input buffer, fill bits are fed to the output buffer at high speed until a full signal is generated indicating that the output buffer is full. Then, a sync signal is fed to the output buffer followed by compressed data from the run length encoder.

It is an object of the present invention to provide a facsimile transmission apparatus comprising improved but simplified means for generating fill bits.

It is another object of the present invention to simplify and improve the construction and operation of a facsimile transmission apparatus.

It is another object of the present invention to provide improved circuitry which enables a facsimile transmission apparatus to be constructed with less complexity and at lower cost than is possible in the prior art.

It is another object of the present invention to provide a generally improved facsimile transmission apparatus.

Other objects, together with the foregoing, are attained in the embodiment described in the following description and illustrated in the accompanying drawing.

DESCRIPTION OF THE PREFERRED EMBODIMENT

While the facsimile transmission apparatus of the present invention is susceptible of numerous physical embodiments, depending upon the environment and requirements of use, substantial numbers of the herein shown and described embodiment have been made, tested and used, and all have performed in an eminently satisfactory manner.

Figure 1:
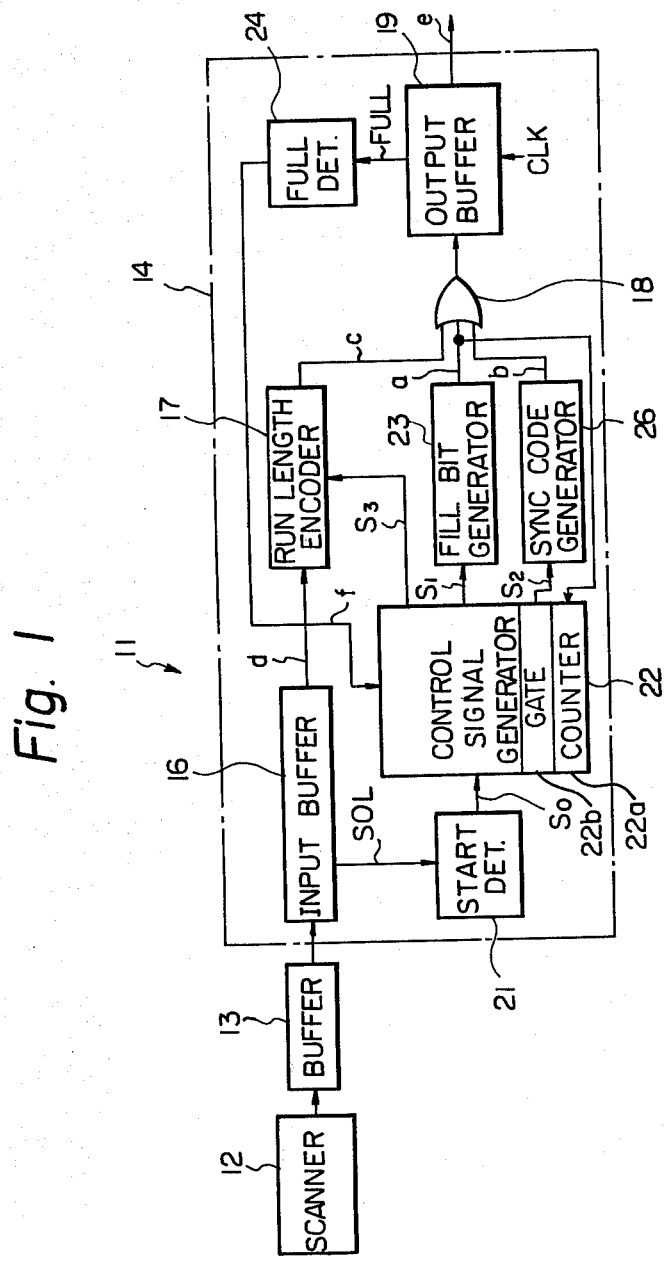
FIG. 1 is a block diagram of a facsimile transmission apparatus embodying the present invention.

Referring now to FIG. 1 of the drawing, a facsimile transmission apparatus embodying the present invention is generally designated by the reference numeral 11 and comprises a scanner 12 for scanning an original document (not shown) in an orthogonal pattern of scan lines. The output of the scanner 12 is fed through a buffer 13 to a processing unit 14.

The processing unit 14 comprises an input buffer 16 which, although not shown in detail, comprises two of more buffer memories. Assuming the case in which the buffer 16 comprises two buffer memories, a line of data bits corresponding to one scan line of the document is stored in one of the memories while a previous line of data is fed out of the other of the memories as data signals d to a run length encoder 17. The encoder functions to run length encode and thereby compress the data. The compressed data is designated as c and is fed through an OR gate 18 to an output buffer 19.

When one line of data has been stored in the buffer 16, a signal SOL is produced and fed to a start signal detector 21. In response to the signal SOL the detector 21 produces a start signal s0 which is fed to a control signal generator 22.

The memory 19 has a predetermined capacity such as 256 bytes. Assuming that a previous line of compressed data has been stored in the buffer 19 from the run length encoder 17 through the OR gate 18, the buffer 19 will either be completely full or will contain a certain number of bits depending on the number of bits required to encode the previous line of data from the scanner 12. The data is applied intermittently to the buffer 19 while the data is read or fed out of the buffer 19 continuously in response to modem clock pulses CLK. The compressed or encoded data is fed from the buffer 19 to a modem (not shown) for modulation and transmission to a remote receiver. The receiver, although not shown, functions to demodulate and decode the data signals and reproduce the document in response thereto.

In response to the start signal s0, the control signal generator 22 feeds a signal s1 to a fill bit generator 23 which generates and feeds fill bits a through the OR gate 18 to the buffer 19. The fill bits typically consist of logically low or zero bits. The fill bits are applied at high speed to the buffer 19 and stored in successively higher memory locations in the same manner, but faster, than compressed data from the encoder 17. When the buffer 19 is completely filled, a FULL signal is produced and fed to full detector 24. In response, the detector 24 feeds a signal f to the control signal generator 22 which terminates the signal s1 and generates a signal s2 which is fed to a sync code generator 26.

In response to the signal s2, the generator 26 feeds a sync code b to the buffer 19 through the OR gate 18. Typically, the sync code consists of a plurality of zero bits (identical to the fill bits) followed by a single logically high or one bit.

After the sync code is fed to the buffer 19, the signal s2 goes low and the generator 22 produces a signal s3 which is fed to the encoder 17. In response, the encoder 17 feeds the compressed data signals c to the buffer 19 through the OR gate 18.

The function of the input buffer 16 is to match the scan rate, which is constant, to the run length encoding rate, which is variable. The function of the output buffer 19, which is of the asynchronous input-output type, is to match the average run length encoding rate, which variable, to the transmission rate, which is constant. The transmission rate is equal to or faster than the scanning rate.

Figure 2:
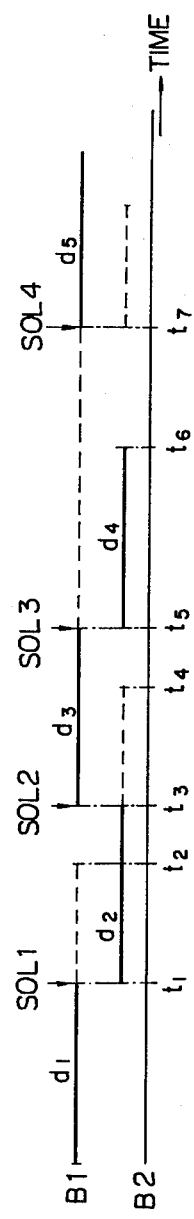
FIG. 2 is a timing diagram illustrating data input and compression.
Figure 3:
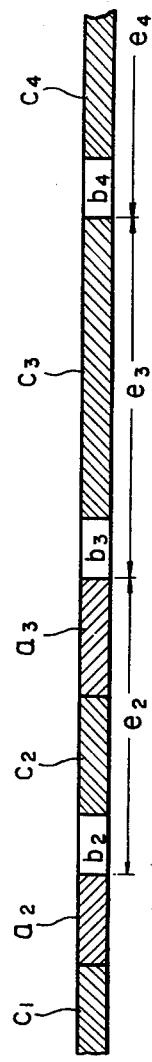
FIG. 3 is a diagram illustrating compressed data output.

The basic operation of the present invention is illustrated in FIGS. 2 and 3. FIG. 2 illustrates the input and encoding operations. It will be assumed that the first line of data, designated as d1, is stored in one of the buffer memories B1 in the input buffer 16. This operation is ended at a time t1 at which the first signal SOL, designated as SOL1, is produced. The start signal s0 is produced at the same time as the signal SOL1. The second line of data, d2, is stored in the other buffer memory B2 in the buffer 16 beginning at the time t1. Also beginning at the time t1, the first line of data is fed from the buffer B1 of the buffer 16 to the run length encoder 17 and compressed. The run length encoding or compression process is finished at a time t2. This corresponds to a line of low information density since the compression is completed at a time t2 which is sooner than a time t3 at which storage of the second line of data d2 in the buffer B2 of the buffer 16 is completed.

The second signal SOL2 is produced at a time t3 at which the second line d2 is fed out of the buffer B2 while the third line of data d3 is stored in the buffer B1. Compression of the second line d2 is completed at a time t4 which is sooner than a time t5 at which storage of the line d3 in the buffer B1 is completed.

The signal SOL3 is produced at the time t5 after which the data d3 is fed out of the buffer B1 while the next line of data d4 is stored in the buffer B2. However, the line d3 has high information density and the run length encoding process takes longer than the length of time required to store the next line d4 in the buffer B2. Storage of the line d4 is completed at a time t6. However, the compression of the line d3 is not completed until a time t7. Thus, the next signal SOL4 is not produced until the time t7 at which the line d4 is fed out of the buffer B2 while the next line d5 is being stored in the buffer B1.

The output of the buffer 19 is illustrated in FIG. 3. The data e2 corresponds to the second line of data d2. Since compression of the line d2 was performed faster than storage of the line d3, the compressed data c2 is insufficient to fill the buffer 19. Therefore, the output data e2 consists of a sync code b2, data c2 and fill bits a3. The output data e3 consists of a sync code b3 and data bits c3. Since the compressed data e3 filled up the buffer 19, there are no fill bits a4. The next line e4 consists of a sync code b4 and data c4 followed by fill bits a5 (not shown).

The sync code typically consists of eleven zero bits followed by a single one bit. Thus, the eleven zero bits are the same as fill bits whereas the one bit can be considered as a sync bit. Although not shown in detail, the sync code generator 26 comprises a counter 22a and gate means 22b for counting the number of fill bits fed to the buffer 19 from the fill bit generator 23. In order for the sync code to be detected properly by the receiver, the output signals e must comprise at least eleven zero bits followed by a one bit. Where at least eleven fill bits have been added, it is redundant to add eleven more zero bits followed by the one bit. This is because the sync code will be detected regardless of the number of zeroes in excess of eleven since the last eleven zero bits followed by the one bit will be detected as a sync code.

The counter 22a counts the number of fill bits generated by the fill bit generator 23. If the number of zero or fill bits is equal to or greater than eleven, the sync code fed to the output buffer 19 by the sync code generator 26 will consist only of a one bit or sync bit. If the number of fill bits is less than eleven, the sync code fed from the sync code generator 26 to the output buffer 19 will consist of a number of zero bits equal to the difference between eleven and the number of fill bits followed by a one bit. For example, if five fill bits were added by the fill bit generator 23, the sync code generator 26 will add an additional six zero bits followed by a one bit.

The buffer 19 is typically a random access memory addressed by an input address pointer and an output address pointer in such a manner that the memory locations are successively addressed from the lowest to the highest and then back to the lowest. The FULL signal may be generated when the input address pointer points to the same address as the output address pointer. At such a point, the run length encoding operation is temporarily interrupted to prevent the input operation from overtaking the output operation. The input operation is resumed as soon as an empty memory location becomes available in the buffer 19.

In summary, it will be seen that the present invention overcomes the drawbacks of the prior art and enables fill bit generation with greatly simplified circuitry. Various modifications will become possible for those skilled in the art after receiving the teachings of the present disclosure without departing from the scope thereof. For example, although the processing unit 14 is illustrated as comprising discrete component parts, it may be embodied in the form of software in a microcomputer.

What is claimed is:

1. A facsimile transmission apparatus including scanning means, compression means, input buffer means for storing two lines of data from the scanning means in such a manner as to feed out one line while storing a next line and output buffer memory means having a predetermined capacity for intermittently storing compressed data from the compression means while continuously feeding out the compressed data, characterized by comprising:
   start detector means for detecting completion of storing a line of data in the input buffer means and producing a start signal in response thereto;
   full detector means for detecting a full condition of the output buffer means and producing a full signal in response thereto;
   fill bit generator means;
   sync signal generator means; and
   control means for controlling, in response to the start signal, the fill bit generator means to feed fill bits to the output buffer means until the full signal is generated, then controlling the sync signal generator means to feed the sync signal to the output buffer means and then controlling the compression means to feed compressed data to the output buffer means.

2. An apparatus as in claim 1, in which the compression means comprises a run length encoder.

3. A facsimile transmission apparatus including scanning means, compression means, input buffer means for storing two lines of data from the scanning means in such a manner as to feed out one line while storing a next line and output buffer memory means having a predetermined capacity for intermittently storing compressed data from the compression means while continuously feeding out the compressed data, characterized by comprising:
   start detector means for detecting completion of storing a line of data in the input buffer means and producing a start signal in response thereto;
   full detector means for detecting a full condition of the output buffer means and producing a full signal in response thereto;
   fill bit generator means;
   sync signal generator means; and
   control means for controlling, in response to the start signal, the fill bit generator means to feed fill bits to the output buffer means until the full signal is generated, then controlling the sync signal generator means to feed the sync signal to the output buffer means and then controlling the compression means to feed compressed data to the output buffer means;
   the sync code generator means comprising means for counting a number of fill bits fed to the output buffer means by the fill bit generator means and, when the counted number is equal to or larger than a predetermined number, feeding only a sync bit to the output buffer means; and when the counted number is less than the predetermined number, feeding a number of fill bits equal to the predetermined number minus the counted number followed by the sync bit to the output buffer means.

4. An apparatus as in claim 3, in which the fill bit generator means and sync code generator means are constructed to generate the fill bits as logically low bits and the sync bit as a logically high bit.

* * * * *